United States Patent [19]
Woods et al.

[11] Patent Number: 5,678,032
[45] Date of Patent: Oct. 14, 1997

[54] METHOD OF OPTIMIZING THE EXECUTION OF PROGRAM INSTUCTIONS BY AN EMULATOR USING A PLURALITY OF EXECUTION UNITS

[75] Inventors: William E. Woods, deceased, late of Natick, by Arnold I. Zaltas, executor; Richard A. Lemay, Carlisle; Edward Kumiega, Pepperell, all of Mass.

[73] Assignee: Bull HN Information Systems Inc., Billerica, Mass.

[21] Appl. No.: 523,876

[22] Filed: Sep. 6, 1995

[51] Int. Cl.$^6$ .................................................. G06F 9/30
[52] U.S. Cl. .................................................. 395/500
[58] Field of Search .................. 364/578; 395/500, 395/375

[56] References Cited

U.S. PATENT DOCUMENTS

| | | | |
|---|---|---|---|
| 5,430,862 | 7/1995 | Smith et al. | 395/500 |
| 5,438,668 | 8/1995 | Coon et al. | 395/375 |
| 5,481,684 | 1/1996 | Richter et al. | 395/375 |
| 5,522,083 | 5/1996 | Gove et al. | 395/800 |
| 5,544,342 | 8/1996 | Dean | 395/446 |
| 5,546,552 | 8/1996 | Coon et al. | 395/375 |

*Primary Examiner*—Kevin J. Teska
*Assistant Examiner*—Stephen J. Walder, Jr.
*Attorney, Agent, or Firm*—Faith F. Driscoll; John S. Solakian

[57] ABSTRACT

An application such as an interpretative emulator executes a wide range of different classes of emulated program instructions developed for the processor architecture being emulated on a host system which includes an dual integer pipelined execution unit. The sets of RISC instructions which execute emulated program instructions are organized within the emulator so as to be processed as two distinct instruction streams by the dual integer pipelined execution units wherein one of the pipelined unit performs the steps necessary to completing a current or foreground like operation on each emulated program instruction while the other pipelined unit performs the steps of an anticipated lookahead or background like operation on the next emulated program instruction. By having one unit execute operations such as interpreting each program instruction within an established foreground instruction stream and the other unit execute operations such as prefetching each next program instruction within an established background instruction stream, the speed of emulated program execution is optimized.

21 Claims, 8 Drawing Sheets

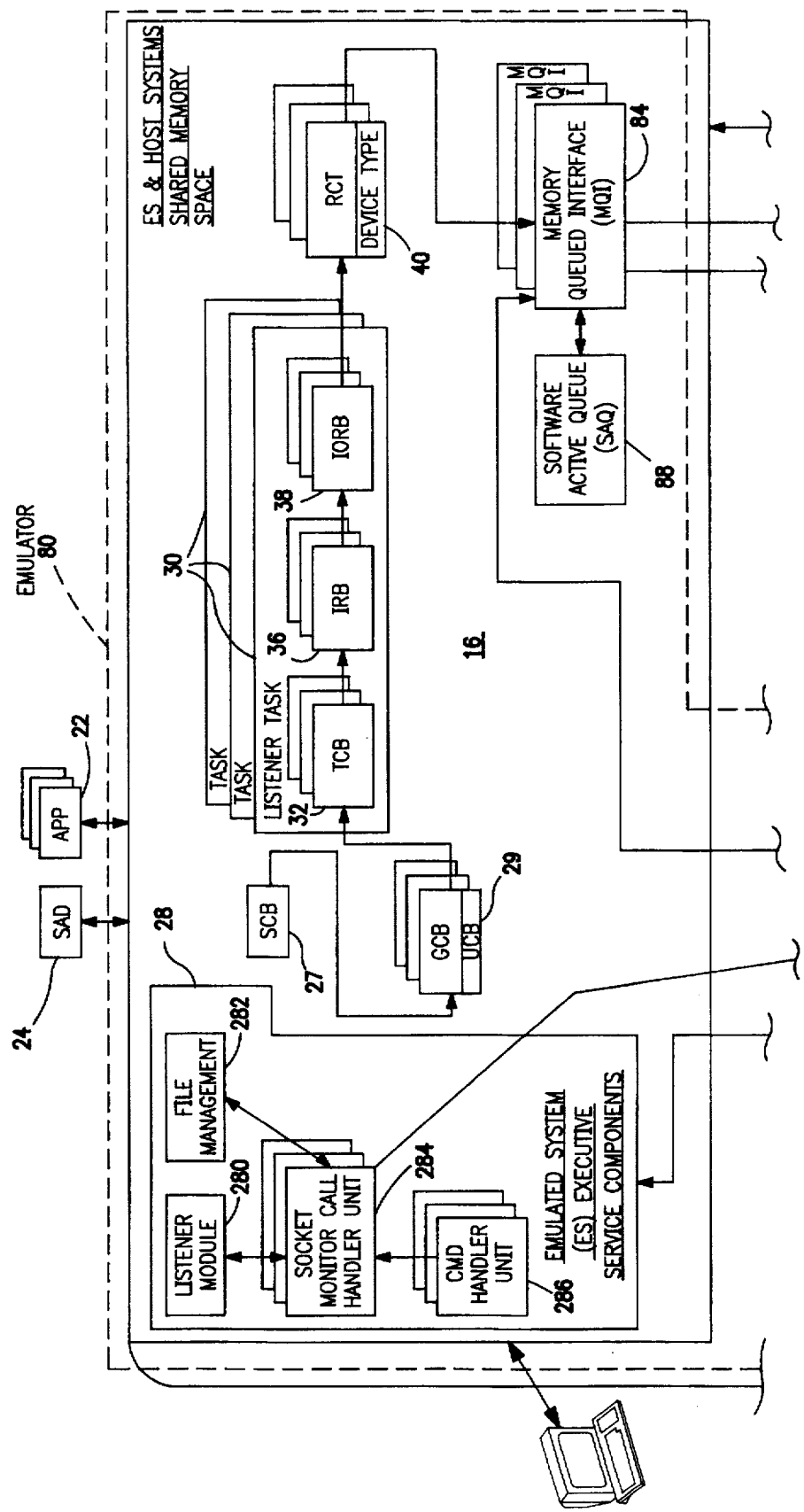

|  | lw(0)=0 | | lw(0)=1 | | |
|---|---|---|---|---|---|
|  | FOREGROUND PROCESSING | BACKGROUND PROCESSING | FOREGROUND PROCESSING | BACKGROUND PROCESSING | |
| soi | COMPUTE SHORT-BRANCH DISPLACEMENT | FETCH NEXT PROCEDURE WORD AND MULTIPLY BY TWO | COMPUTE CURRENT INSTRUCTION xe SPLATTER ADDRESS | FETCH NEXT PROCEDURE WORD | soi |
|  | FETCH 1st WORD OF POTENTIAL BRANCH TARGET |  | LOAD xe SPLATTER REGISTER | FETCH NEXT PROCEDURE WORD | |
|  | MOVE i reg TO cr | SAVE p |  | SAVE p | |
| xa | PERFORM OPERATION<br><br>ADJUST p BY LENGTH OF INSTRUCTION | COMPUTE NEXT INSTRUCTION xa SPLATTER ADDRESS<br><br>LOAD xa SPLATTER REGISTER | COMPUTE ea<br><br>FETCH OPERAND<br><br>ADJUST p BY LENGTH OF INSTRUCTION SO FAR | COMPUTE NEXT INSTRUCTION xa SPLATTER ADDRESS<br><br>LOAD xa SPLATTER REGISTER | xa |
|  |  |  | PERFORM OPERATION | LOAD xa SPLATTER REGISTER | xe |

FIG. 5 ldr, bn (next instruction - ldr, bn)

| | | |
|---|---|---|
| soi_l | P1 lux | fetch MAS xe pointer |
| | Q1 lha | fetch at P+2 |
| | P2 l | fetch RAS xe pointer |
| | Q2 lha | fetch at P+4 |
| soi_lb | P3 mtctr | ready xe splatter address |
| | Q3 sli. | get next iw index |
| | P4 st | save current P |
| | Q4 sli | get next iw index |
| | Gi bbfr | splatter to xa routine |
| xa_b | P5 mr | get effective address |
| | Q5 lx | fetch next iw pointer |
| | P6 mr | centralize next iw |
| | Gv bbtl | if V-pool, convert address |
| | Q6 lha | fetch operand |
| | P7 cal | advance P to next iw |
| | Ga bctr | |
| xe_ldr | P8 srai | xe splatter |
| | Q8 mtlr | set next iw |
| | P9 mr | ready xa splatter address |
| | Q9 rlinm | move operand to register |
| | Ge bge | get index to xe table |
| | P10 lha | start next instruction |
| | Q10 lux | fetch MAS xe pointer |
| | P11 lha | fetch at P+2 |
| | Q11 l | fetch RAS xe pointer |
| | Gs b | to soi_lb |

Note: The pipeline diagram below is a representation of how twenty-two RISC instructions (including branches) execute in nine clocks. The diagram shows only instructions which actually execute; i.e., false paths are not shown.

ldr, bn (Load Register) Part-1

| Clock | 1 | 2 | 3 | 4 | 5 | 6 | 7 |
|---|---|---|---|---|---|---|---|
| Fetch | depends on previous routine | s mode | t mode (@Gi) | s mode | t mode (@Gv) | t mode (@Ga) |
| Dispatch | P1,Q1,P2,Q2 | | P3,Q3,P4,Q4,Gi | | P5,Q5,P6,Gv | Q6,P7,Ga | |
| ICU G | | | | Gi | | Gv | |
| ICU H | | | | | | | |
| Decode#1 | | P1 | P2 | P3 | P4 | P5 | P6 |
| Decode#2 | | Q1 | Q2 | Q3 | Q4 | Q5 | Q6 |
| Execute P | | | P1 | P2 | P3 | P4 | P5 |
| Execute Q | | | Q1 | Q2 | Q3 | Q4 | Q5 | ldr, bn (Load Register) Part-2

| Clock | 8 | 9 | 10 | 11 | 12 | 13 | 14 |
|---|---|---|---|---|---|---|---|
| Fetch | s mode | t mode (@Ge) | s mode | t mode (@Gs) | s mode | t mode (@Gi) | s mode |
| Dispatch | P8,Q8,P9,Q9, Ge | P10,Q10,P11, Q11,Gs | P3,Q3,P4,Q4,Gi | | P3,Q3,P4,Q4,Gi | | P5,Q5,P6,Gv |
| ICU G | Ge | | | Gi | | | |
| ICU H | | | | | | | |
| Decode | P7 | P8 | P9 | P10 | P11 | P3 | P3 |
| Decode | Q7 | Q8 | Q9 | Q10 | Q11 | Q3 | Q3 |
| Execute P | P6 | P7 | P8 | P9 | P10 | P11 | |
| Execute Q | Q6 | bubble | Q8 | Q9 | Q10 | Q11 | |

FIG. 6 ldh, bn (next instruction - ldh, bn)

| sol_l | P1 | lux | fetch MAS xe pointer |
| | Q1 | lha | fetch at P+2 |
| | P2 | l | fetch RAS xe pointer |
| | Q2 | lha | fetch at P+4 |
| soi_lb | P3 | mtctr | ready xe splatter address |
| | Q3 | sli. | get next iw index |
| | P4 | st | save current P |
| | Q4 | sli | get next iw index |
| | Gi | bbfr | splatter to xa routine |
| xa_b | P5 | cax | add index to base |
| | Q5 | mr | centralize next iw |
| | P6 | lx | fetch next iw pointer |
| | Gv | bbtl | if V-pool, convert address |
| | Q6 | lha | fetch operand | catcher invoked here when operand is located in the last byte of the segment

| | Q7 | cal | advance P to next iw |
| | Ga | bctr | xe splatter |
| xe_ldr | P8 | srai | set next iw |
| | Q8 | mtlr | ready xa splatter address |
| | P9 | srai | store left byte |
| | Q9 | rlinm | get index to xe table |
| | Ge | bge | start next instruction |
| | P10 | lha | fetch at P+2 |
| | Q10 | lux | fetch MAS xe pointer |
| | P11 | lha | fetch at P+4 |
| | Q11 | l | fetch RAS xe pointer |

Note: The pipeline diagram below is a representation of how twenty-two RISC instructions (including branches) execute in nine clocks. The diagram shows only instructions which actually execute; i.e., false paths are not shown.

ldh, bn (Load Register) Part-1

| Clock | 1 | 2 | 3 | 4 | 5 | 6 | 7 |
|---|---|---|---|---|---|---|---|
| Fetch | depends on previous routine | | s mode | t mode (@Gi) | s mode | t mode (@Gv) | t mode (@Ga) |
| Dispatch | P1,Q1,P2,Q2 | | P3,Q3,P4,Q4,Gi | | P5,Q5,P6,Gv | Q6,Q7,Ga | |
| ICU G | | | | Gi | | Gv | |
| ICU H | | | | | | | |
| Decode#1 | | P1 | P2 | P3 | P4 | P5 | P6 |
| Decode#2 | | Q1 | Q2 | Q3 | Q4 | Q5 | Q6 |
| Execute P | | | P1 | P2 | P3 | P4 | P5 |
| Execute Q | | | Q1 | Q2 | Q3 | Q4 | Q5 | ldh, bn (Load Register) Part-2

| Clock | 8 | 9 | 10 | 11 | 12 | 13 | 14 |
|---|---|---|---|---|---|---|---|
| Fetch | s mode | t mode (@Ge) | s mode | t mode (@Gs) | s mode | t mode (@Gi) | s mode |
| Dispatch | P8,Q8,P9,Q9,Ge | P10,Q10,P11,Q11,Gs | P3,Q3,P4,Q4,Gi | | P3,Q3,P4,Q4,Gi | | P5,Q5,P6,Gv |
| ICU G | | Ge | | Gi | | | |
| ICU H | | | | | | | |
| Decode | | P8 | P9 | P10 | P11 | P3 | |
| Decode | Q7 | Q8 | Q9 | Q10 | Q11 | Q3 | Q3 |
| Execute P | P6 | bubble | P8 | P9 | P10 | P11 | P3 |
| Execute Q | Q6 | Q7 | Q8 | Q9 | Q10 | Q11 | Q3 |

FIG. 7

METHOD OF OPTIMIZING THE EXECUTION OF PROGRAM INSTUCTIONS BY AN EMULATOR USING A PLURALITY OF EXECUTION UNITS

BACKGROUND OF THE INVENTION

1. Field of Use

The present invention relates generally to computer instruction interpreters and more particularly to the use of apparatus and methods for optimizing instruction interpretation performance.

2. Prior Art

As is well known in the art, there are a number of different techniques which are used to enable applications to be executed more efficiently, such as applications written for a specific computer architecture to be emulated on a host system having a different architecture. In the case of emulation applications, these techniques include static recompilation, dynamic recompilation and interpretive emulation. In the latter, an emulator is written usually to run on the host computer which translates a sequence of emulated program instructions intended to be executed on the emulated architecture into one or more instructions in the host's instruction language to perform the same function.

Of the techniques mentioned, interpretive emulation has been found to be the most desirable emulation technique in terms of emulation accuracy and completeness. But, typically, interpretative emulation is the slowest type of emulation technique. The related copending patent application of Richard S. Bianchi, Dennis R. Flynn, Marcia T. Fogelgren, Richard A. Lemay, Mary E. Tovell and William E. Woods entitled, "Executing Programs of a First System on a Second System," filed on Sep. 28, 1993 bearing Ser. No. 08/128,456, assigned to the same assignee as this patent application improves performance by using an arrangement wherein the emulator is run as a host process which executes emulated program instructions at host processing speed.

A standard simplified way of implementing an interpretative emulator is to employ a dispatch loop within the emulator to fetch an emulated program instruction from the emulated program instruction stream and use the binary value of the program instruction operation code as an address for indexing into a table in memory. The value of the table entry is the starting address of an emulation routine consisting of host instructions that implement the changes of state within the host system required to emulate the original program instruction. The dispatch loop causes a branch to the emulation routine whose instructions are then executed by the host system. The final host instruction within the emulation routine returns control back to the dispatch loop which then fetches the next emulated program instruction. It has been found that this process is time consuming.

As indicated above, to increase the speed of execution of an emulation application, one approach is to run the emulator as a process on a host high speed microprocessor architecture which provide levels of performance which match or exceed the performance level of the emulated computer architecture. But, as advances in microprocessor architectures continue to evolve, it becomes important to be able to take full advantage of such architectural advances to optimize emulator performance.

An example of such advances is the hardware improvements made in the POWER2 ™ architecture developed by IBM Corporation. These improvements are described in two 1994 articles, one entitled "POWER2: Next Generation of the RISC System System/6000 Family" by Steven W. White and Sudhir Dhawan and the other entitled "Migration and Compatibility" by John Reysa, et al. Such improvements include additional functional units, such as two integer units and two floating point units. The articles suggest an approach to enhance emulator performance which is the enhanced exploitation of the functional units obtainable through recompiling for a POWER2 target. The compiler is described as being able to expose additional instruction-level parallelism after more aggressive loop unrolling. Also, the articles indicate that this allows applications to benefit from new instructions.

While the above recompiling approach provides an increase in emulator performance, performance is still less than what may be anticipated from doubling the number of functional units within a host system. Further, many applications can not be recompiled since they were not initially written in a higher level language.

Accordingly, it is a primary object of the present invention to optimize the performance of an emulator which runs in a host system having a plurality of execution units without requiring emulated program recompilation.

SUMMARY OF THE INVENTION

The above object and other advantages of the present invention are achieved in the preferred embodiment of the interpreter of the present invention which is designed to execute a wide range of different classes of emulated program instructions developed for the processor architecture being emulated on a host system which includes a high performance execution unit architecture.

The organization of the present invention focuses on establishing parallel instruction streams of execution at a higher level of an interpreter unit to exploit fully, the capabilities of the host system execution unit architecture which in the preferred embodiment utilizes two integer pipelined execution units. The organization allows one of the dual execution units to perform the steps necessary to completing a current or foreground like operation on each emulated program instruction while the other execution unit performs the steps of an anticipated lookahead or background like operation on each emulated program instruction. By having one functional unit execute operations such as interpreting each emulated program instruction contained in a foreground instruction stream and the other functional unit execute operations such as prefetching each next emulated program instruction contained in a background instruction stream, interpreter unit performance is optimized.

In more particular terms, the teachings of the present invention involve first, the generation of a set of host RISC instructions of a routine or code fragment for each different type of emulated program instruction which are to be executed by a first one of the execution units. This results in the generation of a different routine containing a set of RISC instructions for each unique emulated program instruction. While this may suggest that a particular routine will be used by more than one emulated program instruction, this is not required.

Next, a second set of RISC instructions of a common fetch routine are generated for carrying out an instruction fetch operation. This routine containing a set of RISC instructions is common to or used by each different type of emulated program instruction. In accordance with the present invention, the different sets of RISC instructions of the routines are interleaved in a predetermined manner. That is, the RISC instructions in each of the routines generated in the first step are interleaved with the RISC instructions of the common routine generated in the second step.

Thus, in the preferred embodiment of the present invention, the interpreter unit contains a number of different RISC instruction sequences or code fragments, at least some of which each include a replicated set of the RISC instructions of the common fetch routine or code fragment. Dispatch logic utilized by the execution units dispatches the sets of interleaved RISC instructions to the execution units which execute them in parallel performing both foreground and background instruction operations simultaneously. This results in a reduction in the number of RISC clock cycles or shorter dispatch path or loop which result in substantial increase in interpreter unit performance.

Further, emulator performance is optimized without creating any conflicts in host system process operations which would reduce overall system performance. In greater detail, when a certain type of violation condition is signaled to the emulator by the host system attributable to the interpreter unit execution of an optimized emulated program instruction, the condition is examined by the emulator to determine if the violation can be treated as a false alarm and processed without terminating interpreter unit operation. In more particular terms, a mechanism is included within the emulator which examines each signal denoting segment violations for determining if it relates to the execution of an optimized emulated program instruction. It does this by examining the memory address and the particular RISC instruction being executed at that time. When the mechanism determines that the interpreter unit is in a particular phase of executing a particular type of emulated program instruction, the mechanism causes the interpreter unit to execute a predetermined routine which allows recovery from the segment violation. The interpreter unit is thereafter permitted to continue instruction processing. This approach eliminates the need for taking steps to prevent the occurrence of such violations which would introduce further complexity in addition to not faithfully emulating the behavior of the target system.

The above object and advantages of the present invention will be better understood from the following description when taken in conjunction with the accompanying drawings.

BRIEF DESCRIPTION OF THE DRAWINGS

FIGS. 1a and 1b show in block diagram form, a host system which includes an emulator system which incorporates the method and interpreter unit of the present invention.

FIG. 5 is a diagram illustrating the overall implementation strategy of the present invention.

FIGS. 6 and 7 are timing diagrams used in explaining the operation of the present invention.

DESCRIPTION OF THE PREFERRED EMBODIMENT

Figure 1B:
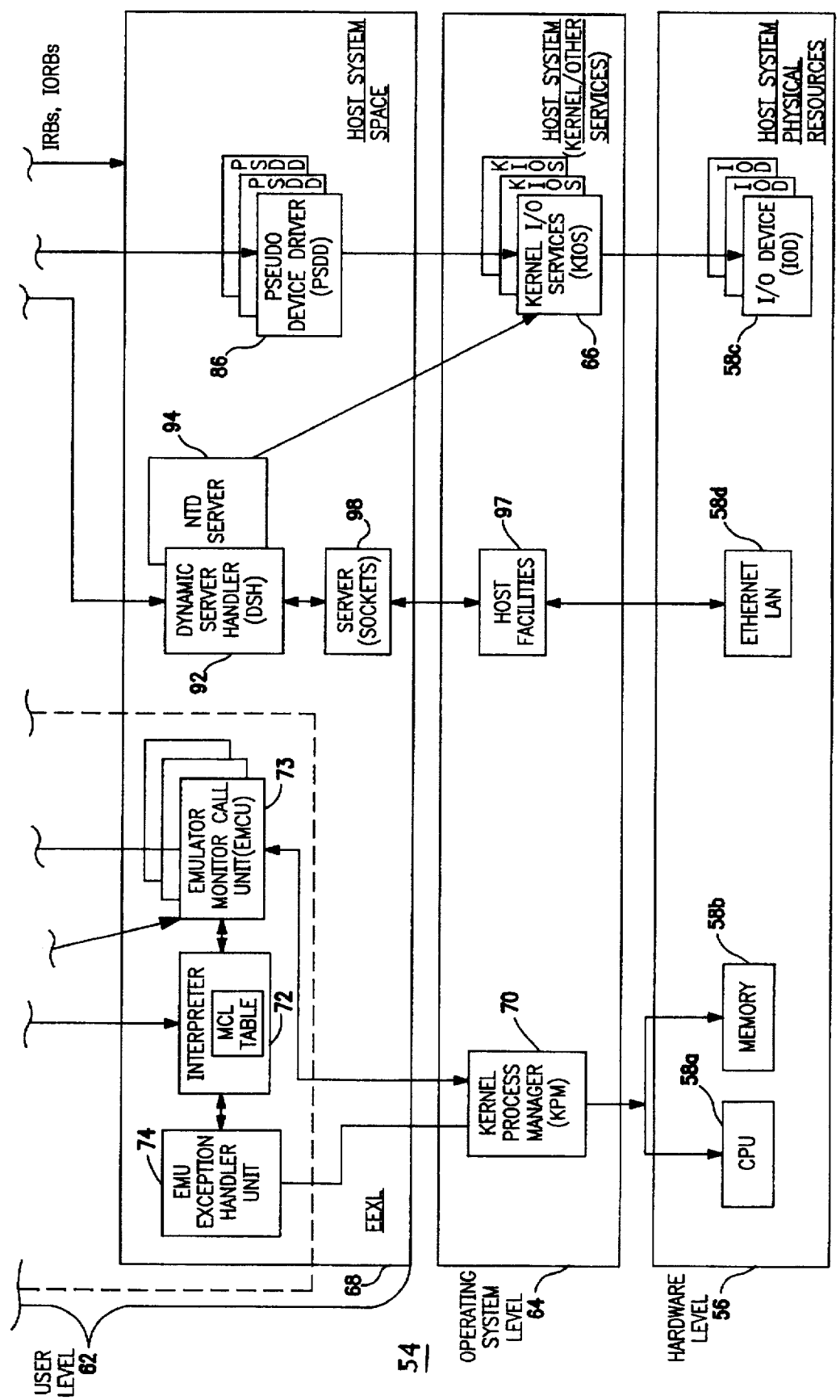

FIGS. 1a and 1b illustrate a host system 54 which incorporates the components of the present invention. As shown, the system 54 includes a hardware platform 56 which contains the hardware elements such as a central processing unit 58a, a main memory 58b and a number of input/output peripheral devices 58c and a communications facility such as an Ethernet local area network (LAN) 58d for connecting system 54 to other processing systems via standard communication network facilities.

The central processing unit (CPU) represented by block 58a is a reduced instruction set (RISC) based processing unit which takes the form of the RS6000 microprocessor manufactured by IBM corporation. More specifically, according to the teachings of the present invention, the CPU 58a utilizes the POWER2 processor implementation which provides very high performance in fixed point applications. The architecture is described in detail in a paper entitled "POWER2 Fixed-Point, Data Cache and Storage Control Units" by D. J. Shippy, T. W. Griffith and Geordie Braceras copyrighted 1994 available on the World Wide Web at call-iblm@austin.ibm.com.

As seen from FIG. 1b, hardware platform including processing unit 58a operates under the control of an enhanced version of the UNIX* operating system such as the AIX** operating system. Portions of physical memory represented by MEM block 58b are illustrated in terms of the layered construction. As shown, memory is divided into two basic levels, a user level and an operating system level. The user level is divided into emulated system (ES) and host shared memory space and host or an operating system kernel native memory space. The shared memory space contains the ES executive level 16 which includes a plurality of executive program tasks 30 spawned by ES executive services components of block 28 for executing ES application programs 22 and system administrator programs 24.

*UNIX is a registered trademark in the United States and other countries, licensed exclusively through X/Open Limited Company.

**AIX is a registered trademark of International Business Machines Corporation.

In the emulated system, each task 30 utilizes a plurality of data control structures, such as a task control block (TCB) structure 32, an indirect request block (IRB) structure 36, an input/output request block (IORB) structure 38 and a resource control table (RCT) structure 40. The task control block (TCB) structure 32 contains information pertaining to the state of execution of the associated task as web as pointers to interrupt save areas for storing hardware parameters related to the task. The indirect request block (IRB) structure 36 contains information defining the operation requested by an associated task and includes pointers identifying the task and its associated task control block (TCB) and a pointer to the associated IORB structure.

The input/output request block (IORB) structure 38 is used as the standard means of requesting a physical I/O service. It contains information such as a logical resource number (LRN) that identifies the I/O device being addressed as well as the location and size of the buffer to be used for the transfer and the specific function (operation) requested. The resource control table (RCT) structure 40 contains information describing the resources, such as its characteristics or information regarding the tasks or requests being executed by a corresponding resource as well as pointers to its associated task control block (TCB) structure.

Additionally, two other structures depicted in FIG. 1a are a group control block (GCB) structure and a user control block structure of block 29. The GCB structure contains information required to define and control the operations of a specific task group which defines a named set of one or more tasks with a common set of resources within which a user and system function must operate. Each group has a two character name (e.g., $L, $S) by which the group is uniquely known to the system. The GCB structure includes information identifying the lead task whose execution spawns all other tasks required for executing group programs. As indicated, the GCB structure includes a number of user control blocks (UCB), each of which contains information defining the user's personality such as user node identification, user group id within a node, user task id within group, user person id and pointer information to directories to which the user has access.

As shown, the emulated system utilizes a further data structure corresponding to system control block (SCB) structure 27. This data structure is created at system startup and contains information defining system resources and pointers to the different task groups established by the system represented by a corresponding number of group control blocks in the system. For further information regarding such structures and their relationships to each other, reference may be made to U.S. Pat. No. 5,111,384 and the publication entitled "HVS PLUS Systems Concepts" published by Bull HN Information Systems Inc., Order No. HE03-01.

As indicated in FIG. 1a, the shared memory space further includes a memory queued interface (MQI) represented by block 84 which provides a form of interprocess communication mechanism and a software active queue (SAQ) of block 88. SAQ block 88 represents a data structure used to provide the path by which the results of the operations performed by the kernel level components are passed back or returned by the host processes to the requesting emulated system user level tasks 30 being executed. Thus, it can be viewed as functioning as an output stage of MQI 84. This data structure is similar to data structures which are used by the emulated system operating system.

MQI block 84 is a semaphore data structure which takes the form of a single linked list controlled by semaphores through a set of routines which are executed by the various host processes operating within different levels or layers that want to communicate with each other. Its routines are used to manage queues within the pseudo device drivers 86 and the software active queue 88.

Executive Services Components 28

As seen in FIG. 1a, the executive services components 28 of executive layer 16 includes a plurality of components or facilities which are equivalent to those facilities normally included in the emulated system. The facilities include a listener module 280, a file management facility 282, a monitor call unit 284 and an ES command handler unit 286 which are arranged as shown. The listener module 280 is responsible for monitoring the operations of terminals configured for login and for initiating user tasks in response to user commands. As indicated in FIG. 1, listener module 280 runs as a task 30 with its own set of unique data structures.

The listener module 280 consults a profiles file containing user specific registration information such as user id, login id and password requirements tabulated by the system administrator for all registered users. The listener module 280 checks the user profile when monitoring the privileges and/or restrictions given to each user. The file management facility 282 includes the conventional shared data structure and set of routines normally provided to perform functions that access such data structure to control the synchronization of concurrent processes or tasks in addition to performing various system services or functions. That is, the facility responds to system service monitor calls identifying the types of services requested (e.g. creating or deleting files, reading or writing records or blocks in files) which result in the specified system services being executed by the emulated system on behalf of executing user application programs.

The monitor call unit 284 receives monitor calls from the interpreter component 72 which are in turn to be executed interpretively using the ES executive service components of block 28. The command handler unit 286 contains the routines that respond to user commands entered vial a terminal or program. In response to such commands, the unit 286 routines invoke the appropriate tasks for executing such commands.

Emulation Level Layer 68

As indicated in FIG. 1b, the next layer within the user level is the emulator executive level 68. This level includes certain components present in the emulated system which have been transformed into new mechanisms which appear to the remaining unchanged components to operate as the original unchanged components of the emulated system. At the same time, these new mechanisms appear to the components of the kernel level 64 as native components with which the host system is accustomed to operate. As shown, the components include the interpreter 72, an emulator monitor call unit (EMCU) 73, an emulator interrupt handler unit (EEHU) 74, a plurality of servers 90 through 98, and a plurality of pseudo device drivers (PSDD) 86 arranged as shown.

Both the EMCU 73 and EEHU 74 operatively couple to operating system/kernel mechanisms included in kernel level 64 as discussed herein. The EEHU 74 receives "signals" from the kernel level 64, as shown and in turn takes the appropriate actions relative to the emulator 80. According to the present invention, the EEHU 74 includes a "catcher" mechanism which as explained herein in greater detail, catches "signals" for enabling interpreter instruction processing to continue notwithstanding receipt of "signals" indicative of segment violations which would normally cause the process running the interpreter to terminate.

The interpreter unit 72 successively fetches the instructions of an emulated program, categorizes each instruction and executes it interpretively through sequences of RISC instructions which allow CPU 58a, MEM 58b and other elements of host system 54 to emulate the operations of corresponding elements of the emulated system. The interpreter 72 includes a monitor call (MCL) table containing information for each possible monitor call which it utilizes to determine whether to trap or send an ES monitor call to the ES executive services components 28 for execution of the instruction or to make an emulator call to EMCU 73 for execution of the instruction through the services of an appropriate C language routine (e.g., server).

Also, interpreter unit 72, as described in greater detail herein, includes routines which perform a dispatch function wherein the operation code of an emulated program instruction is used to index into an emulator jump table (not shown). The table contains a plurality of address pointer entries (e.g. up to $2^{16}$ entries). The pointer obtained by the indexing designates the set or RISC instructions of the routine or code fragment to be executed by the host system required to emulate the instruction of the original emulated program. According to the present invention, the interpreter unit 72 is organized in a manner which reduces or shortens the time required to perform the dispatch function (i.e., decreases the number of instructions contained in the dispatch loop).

As viewed by the host system 54 of FIGS. 1a and 1b, the ES service components 28 and tasks 30 being executed on behalf of the application programs, the interpreter 72 and EMCU 73 are executed in system 54 as a single process comprising emulator 80 wherein such process corresponds to one or more user processes or stated differently, emulator 80 executes one or more emulated system user processes. Thus, it is possible to have multiple instances of the emulated system concurrently being emulated on host system 54.

The dynamic server handler (DSH) 92 and the network terminal driver (NTD) server 94 are created by EMCU 73 during initialization. Each of the servers 92 and 94 communicate with emulated system processes through MQI 84 as indicated. The lower level server 98 is dynamically created by their respective higher level server 92. As indicated, the server 98 provides socket communication capabilities through socket facilities included within kernel level 64 and through LAN 58d. The NTD server 94 is designed to contain the functionality required to handle different types of terminals such as the network terminal driver described in U.S. Pat. No. 4,951,245 which issued on Aug. 21, 1990.

As indicated in FIG. 1b, the emulator executive level 68 further includes a plurality of pseudo device drivers (PSDD) 86 for each input/output device or type of input/output device which is required to be emulated by host system 54. For example, the pseudo device drivers 86 will include PSDDs for terminals, disk driver, tape drivers, displays and for certain communication devices.

For further details regarding the other components of FIGS. 1a and 1b, reference may be made to the previously cited related copending patent applications.

Operating System/Kernel Level 64

The operating system/kernel 64 includes the standard mechanisms and components normally included within the host operating system. As shown, level 64 includes a kernel process manager component 70 and a number of host kernel I/O services (KIOS) processes 66 for each pseudo device driver (PSDD) 86 which is to be emulated by the host system 54 and for NED server 94. Since the components of kernel level 64 are well known, they are only briefly described herein.

The kernel process manager component 70 includes an exception/interrupt services mechanism. The mechanism handles both interrupts and exception conditions (i.e. unexpected events caused by a process such as illegally addressing memory which can cause a segment violation signal). Exceptions can happen "in the middle" of the execution of a RISC instruction and the host system normally attempts to restart the instruction after handling the exception condition.

The kernel level 64 permits certain exception/interrupt conditions to be handled by the user level 62. The kernel level 64 generates "SIGNALs" which inform processes of the occurrence of synchronous events such as exception conditions. The process executing the instruction upon receipt of a SIGNAL denoting the occurrence of an event such as a segment violation, normally exits by executing an exit system call. This is done to prevent data corruption. For the purpose of the present invention, the kernel exception/interrupt handler mechanism can be viewed as conventional in both its construction and operation.

Additionally, in the preferred embodiment of host system 54, kernel level 64 is assumed to contain the standard utility programs, shell, editors, compilers, etc. and libraries (e.g., I/O libraries, open, close) which are accessed in the host user mode. For further information regarding the use of such components, reference may be made to publications of the IBM Corporation describing the AIX operating system.

Figure 2:
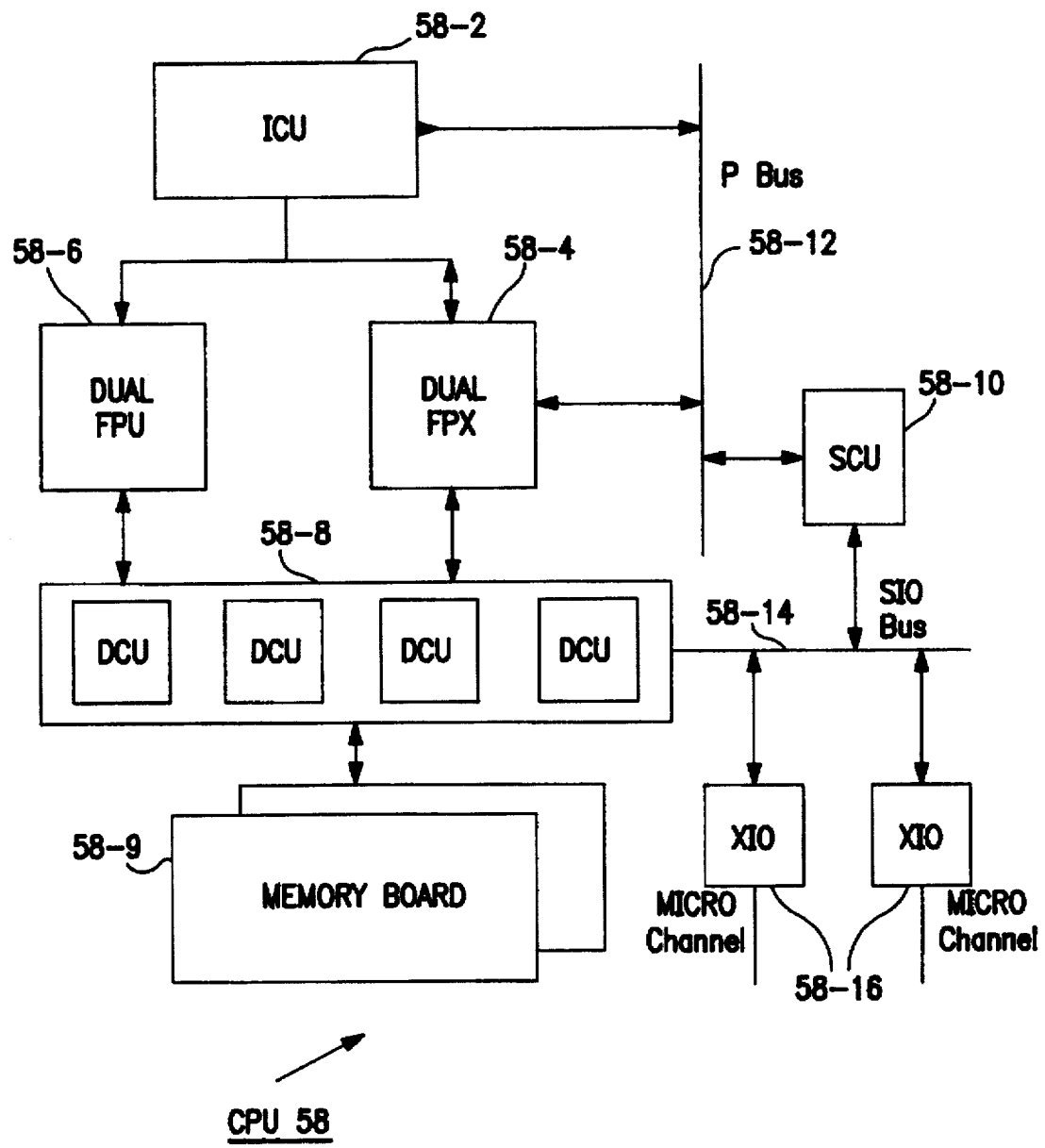
FIGS. 2 and 3 show in greater detail, a portion of the CPU of FIG. 1.
Figure 3:
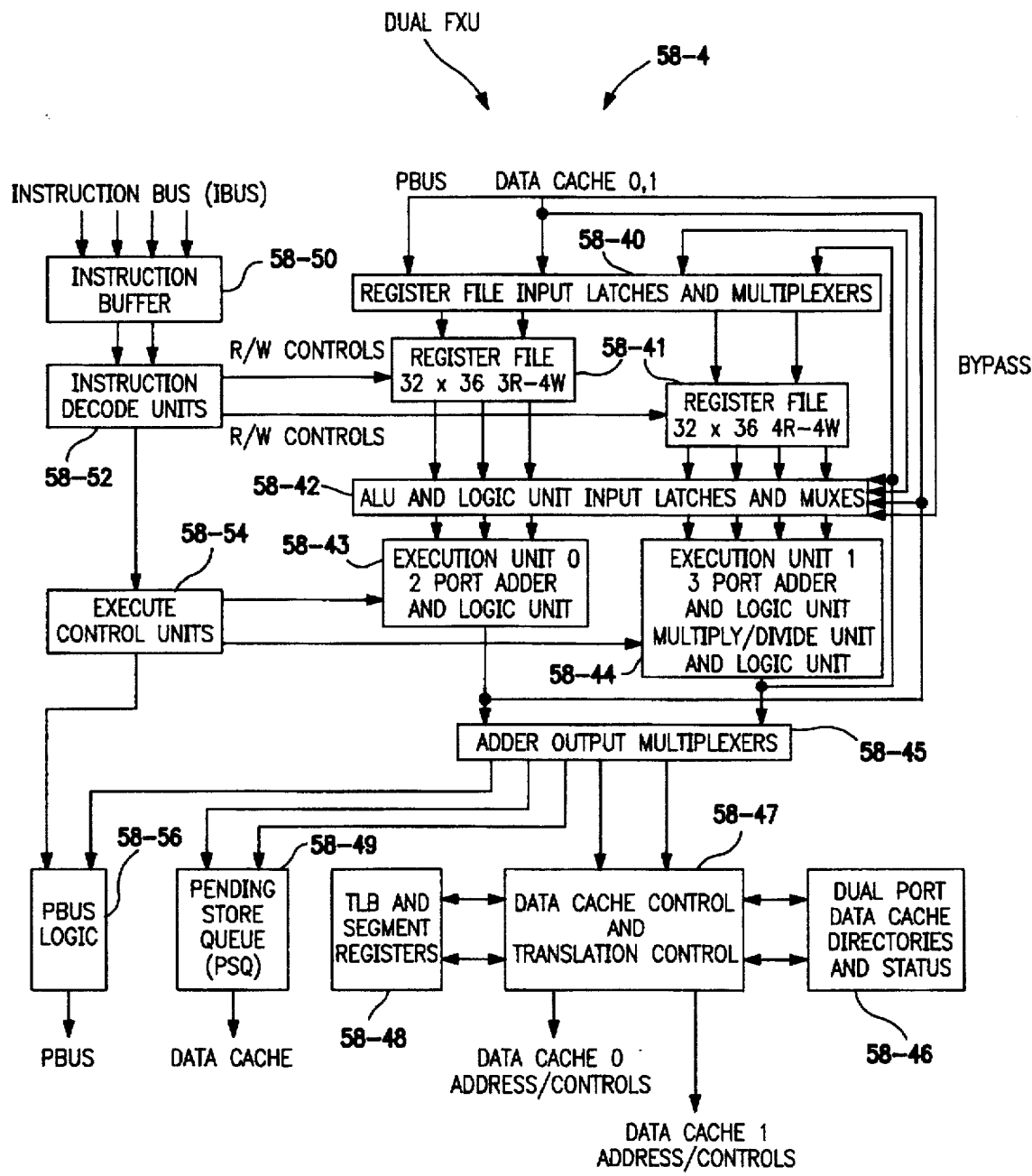

FIGS. 2 & 3—CPU Dual Pipelined Execution Unit Architecture

FIG. 2 shows in block diagram form, a portion of the architecture of CPU 58 whose hardware capabilities are exploited by the present invention. As shown, CPU 58 includes an Instruction Cache Unit (ICU) 58-2, a dual fixed point unit (FXU) 58-4, a dual floating point unit (FPU) 58-6, four data cache units (DCUs) 58-8 which couple to a plurality of memory boards 58-9 and a storage control unit (SCU) 58-10 connected to a processor PBUS and SIO bus 58-14 which couples to a plurality of microchannels via interface units 58-16. The ICU 58-2 prefetches instructions from an instruction (I) cache, not shown, and places them in one of two instruction buffers. The ICU can fetch eight instructions per cycle from the I cache and can dispatch six instructions per cycle, two internally and 4 externally to the FXU 58-4 and FPU 58-6.

Control logic included within ICU 58-2 decodes or analyzes the instructions in the buffers and executes ICU instructions which are primarily branches. The ICU 58-2 dispatches non-ICU instructions to the FXU 58-4 and FPU 58-6 over a four instruction wide instruction dispatch bus (I BUS). The FXU 58-4 and FPU 58-6 each contain two execution units.

FIG. 3 illustrates in greater detail, the organization of the FXU 58-4. The FXU 58-4 performs all storage references, integer arithmetic and logical operations. The FXU 58-4 contains thirty-two 32 bit general purpose registers (GPRs) implemented by two multiport register files 58-41, two fixed point execution units 58-43 and 58-44, a data cache directory 58-46 which couples to the control circuits of block 58-47, and the TLB and Segment Registers 58-48.

The register files 58-14 are coupled to receive data from the PBUS and from the data caches via input latches and multiplexer circuits of block 58-40. Also, the files 58-41 provide output data to execution units 58-43 and 58-44.

The dual execution units 58-43 and 58-44 can execute a total of two instructions per cycle. The FXU 58-4 also includes an instruction buffer 58-50 which queues instructions for the two instruction decode units of block 58-52. The decode units of block 58-52 decode the instructions and issue them to the two execution units 58-43 and 58-44. The decode units of block 58-52 also control the GPRs of the register files 58-41. As indicated, each execution unit contains an adder and a logic functional unit. The execution unit 58-44 also contains a multiply and divide unit.

Figure 4:
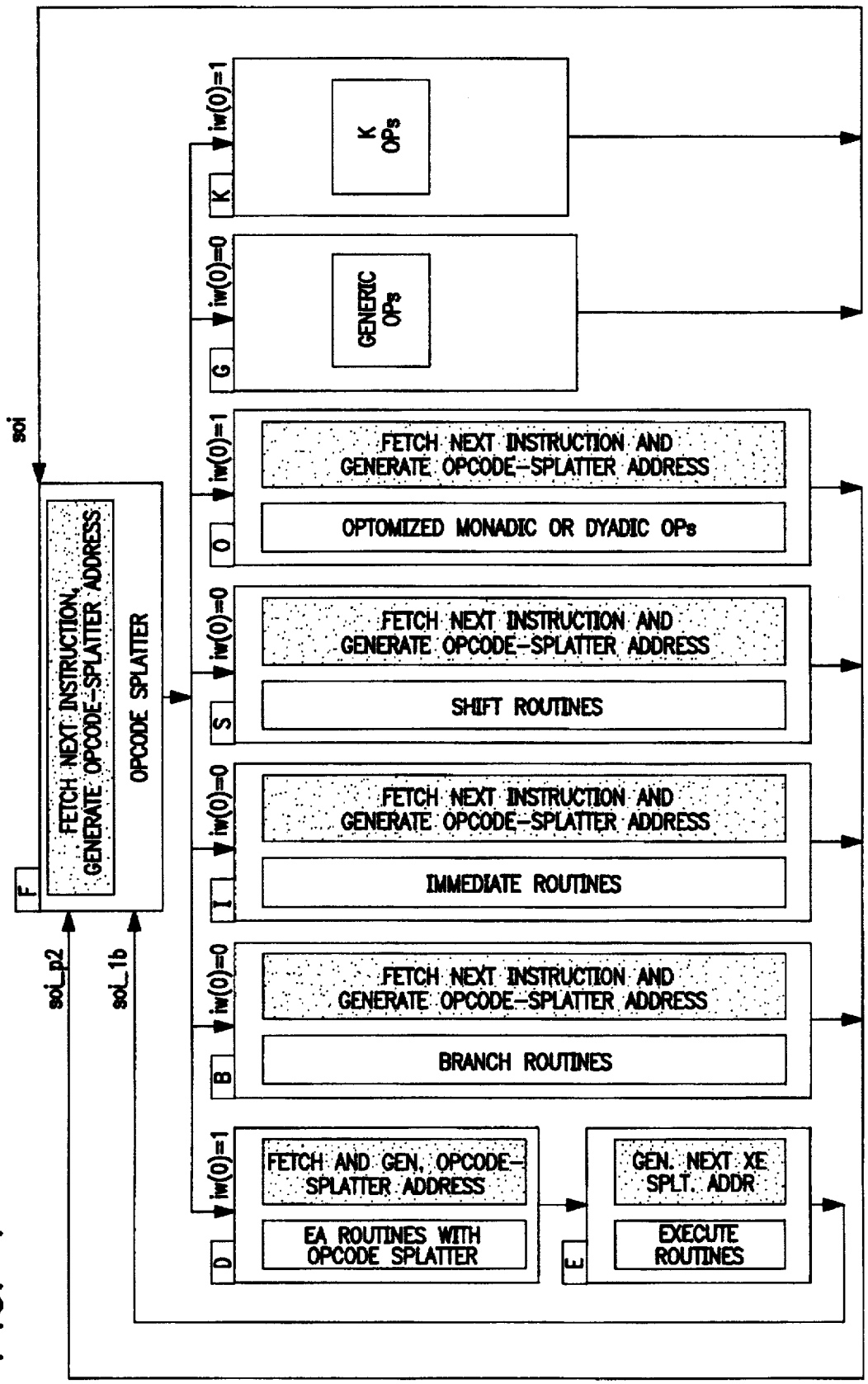
FIG. 4 is block diagram of the interpreter unit of FIG. 1 constructed according to the teachings of the present invention.

FIG. 4—Interpreter Unit 72

The interpreter unit 72 of the present invention is organized in a way which exploits to the extent possible, the performance advantages of the above described CPU dual pipelined execution unit architecture in optimizing emulator instruction execution. This is accomplished by organizing the interpreter unit 72 as diagramatically illustrated in FIG. 4. Also, such performance is achieved by including a mechanism within the emulator exception handler 74 which ensures that performance is maintained notwithstanding the occurrence of segment violation types of exception conditions.

Referring to FIG. 4, it is seen that the interpreter unit 72 comprises a plurality of blocks which correspond to the different groups of routines or code fragments used to execute the different classes/types of emulated program instructions. Each such routine consists of a set or sequence of RISC instructions. These different groups of routines are designated by the letters D, E, B, I, S, O, G, K and F and perform the required operations for executing the different types of emulated instructions. As indicated, these types/classes include branch, intermediate, shift, effective address, generic and K types of instructions.

As indicated in FIG. 4, these routines are divided into two general groups designated as Iw(0)=0 and Iw(0)=1. This grouping follows the original instruction coding designed to simplify decoding wherein one group of emulated program instructions contain operation codes having binary ZEROS in the most significant/high order bit position and the other group of emulated program instructions contain operation codes having binary ONES in the most significant bit position. Thus, B, I, S and G type instructions are included in group Iw(0)=0 while D, O and K type instructions are included in group Iw(0)=1. The instructions in these two groups are discussed later herein with reference to FIG. 5. For general information about these types of instructions and their formatting, reference may be made to the cited publications and to the document entitled "ONE PLUS Assembly Language (MAP) Reference Manual published by Bull HN Information Systems Inc., copyright 1986, order no. HE38-00.

The organization of the present invention shortens the normal "dispatch" path or loop executed by the interpreter unit 72 for certain types of emulated program instructions which can take advantage of the CPU architecture described above. This is accomplished by incorporating into each of the blocks or code fragments labeled D, E, B, I, S, and O, a duplicated or replicated set of RISC instructions of the common fetch routine of block F. This is diagrammatically illustrated by the shaded blocks included in each of the blocks labeled D, E, B, I, S, and O and the different entry point "soi_1b into the common fetch routine of block F. This integration results in the tightest possible loop produced by the simultaneous use of both integer units as discussed herein.

It will be appreciated that the code fragments used by instructions which are not optimized are appropriately modified/recoded so as to continue to reference the common fetch routine of block F at the proper entry point "soi" as indicated in FIG. 4. The types of emulated program instructions which are not optimized include certain types of commercial instructions such as a multiply or a move instruction whose execution routine length is quite long in comparison to the length of the fetch routine. In this instance, there is no performance advantage gained to interleave RISC instructions of these types of routines.

The division within the different blocks of FIG. 4 also shows that the RISC instructions are executed in parallel simultaneously to do both the execution portion of the current emulated program instruction and the fetch and decode for the next emulated program instruction. When the common fetch code and execution code have been so incorporated, this results in the interleaving of the duplicated RISC instructions contained in the shaded portion of block F with the RISC instructions of each of the routines of blocks D, E, B, I, S and O. The result is that those RISC instructions of block F duplicated into the routines contained in block D, E, B, I, S and O are executed in parallel with the RISC instructions of each such routine. This in turn reduces the number of RISC clock cycles or the duration of the dispatch path/loop so that upon completing the execution of a current emulated program instruction, interpreter unit 72 returns to a lower entry point corresponding to soi_1b or soi_p2 in the F routine as indicated in FIG. 4.

It will be appreciated that since the RISC instructions being interleaved pertain to foreground and background operations which pertain to different emulated program instructions, there are normally no conflicts relative to resources etc. But, because of different hardware constraints and resource conflicts relative to the RISC instructions pertaining to a particular routine, in certain instances it becomes necessary to reorder the interleaved RISC instructions to satisfy any constraints and conflicts which are likely to arise. In certain instances, RISC instructions are reordered to fill unused clock cycles which may be used to execute background or foreground operations. Overall, such reordering ensures that the interpreter unit's optimized performance is not offset by the other factors mentioned and in some cases is further enhanced.

FIG. 5 illustrates in tabular form, the overall implementation strategy of the interpreter unit 72 discussed above. As shown, the table indicates which operations for the groups Iw(0)=0 and Iw(0)=1 are executed by one of the execution units 58-43 as a foreground RISC instruction stream and the other execution unit 58-44 as a background RISC instruction stream. In general, as discussed, the foreground instruction stream interprets the current emulated program instruction and the background instruction stream prefetches the next emulated program instruction.

More specifically, the interpreter unit 72 of emulator 80 establishes a correspondence between the registers of the system being emulated and the registers of CPU 58a. For example, a program visible register of CPU 58a is dedicated to perform the function of the "p" counter of the system being emulated. In the present embodiment, the program visible registers include a procedure "p" counter, an instruction "I" register and xa and xe splatter registers.

According to the present invention, certain general operating parameters are established for executing the instruction code fragments which govern the contents/state of the p counter, xa splatter address and the xa splatter register in addition to the xe splatter address and xe splatter register. In the case of the p counter, these operating parameters are that upon entering the soi common fetch routine, the p counter contains the address of the first word of the emulated program instruction and upon exiting the soi common fetch routine, the p counter contains the address of the first word of the current emulated program instruction. Lastly, upon exiting an execution routine "xa" used by an instruction in group Iw(0)=0, the p counter contains the address of the first word of the next emulated program instruction.

The xa splatter address for the next emulated program instruction is computed by the xa routine of the current emulated program instruction. The computed xa splatter address is loaded into the xa splatter register by the xe routine. For those emulated program instructions without xe routines, the xa splatter address is loaded into the xa splatter register by the xa routine.

Instruction Groups Iw(0)=0 and Iw(0)=1

As indicated in the table of FIG. 5, each instruction in the Iw(0)=0 group is emulated by executing two types of RISC routines. These are an soi_0 routine which is common to all Iw(0)=0 instructions and an xa routine which is unique to each opcode. The major types of emulated program instructions in this group branch instructions, value instructions and commercial instructions.

More than half of all of the emulated program instructions fall into the Iw(0)=1 group. As shown in the table, each instruction in this group is emulated by executing three types of RISC routines. These are an soi_1 routine which is common to all instructions in this group, an xa routine which is unique to each emulated program instruction address syllable type and an xe routine which is unique to each opcode.

DESCRIPTION OF OPERATION

The operation of the interpreter unit 72 of the present invention will now be described with reference to FIGS. 6 and 7. Both are timing diagrams illustrating the different cycles of operation or states sequenced through in executing representative instructions in group Iw(0)=1. The lust example instruction is an emulated program instruction specifying a load R register (LDR, Bn) operation which uses the content of a base register (Bn) as an operand address. The code fragments designated on the left side of FIG. 6 are the same as those indicated in the timing state portion of the figure with different labels showing the transitions between the different code fragments/routines within the interpreter unit 72. Such code fragments are discontiguous sections of code in the interpreter unit 72 as is illustrated in a first appendix (Appendix I) included herein which contains the relevant source code for the load R register emulated program instruction.

Since this is an optimized emulated program instruction, a portion of the normal common fetch routine of block F is bypassed. The first clock cycle begins at an entry point soi_1 wherein the ICU 58-2 dispatches a sequence of previously fetched RISC instructions, P1, Q1, P2, and Q2 to the different units as shown. More specifically, during clock cycle 2, the RISC instructions of the interleaved code fragments are dispatched to the FXU decode #1 and #2 units of block 58-52 of FIG. 3. In clock cycle 3, the execution units 58-43 and 58-44 execute these RISC instructions in parallel. This sequence continues with subsequently fetched RISC instructions as indicated in FIG. 6.

Appendix I indicates in greater detail, the organization of RISC instructions and the foreground and background operations performed by each of the distinct independent code fragments of blocks D and E of FIG. 4. As indicated, the code fragments of blocks D and E are executed in sequence. The first RISC routine fragment (xa) calculates the effective address associated with the emulated instruction and fetches the operand data for that instruction. The second RISC routine fragment (xe) which is the execution part performs the actual functional work of that particular emulated program instruction (i.e., load register).

The parallel operations take place during the execution of both blocks (i.e., D and E) as compared to the parallel operations taking place during the execution of a single block or code fragment as in the cases of blocks B, I and S. As noted in Appendix I, because of these parallel operations, the dispatch path is shortened by four RISC instructions in the case of the emulated load register instruction. This has been found to provide a substantial increase in performance.

It will be noted that different ones of the RISC instructions of Appendix I have been labeled "f" and "b" respectively for designating which RISC instructions are performing foreground operations and background operations. Appendix I illustrates certain RISC instructions have been reordered to satisfy hardware constraints/delays, resource conflicts and for further maximizing performance. It will be appreciated that as the emulated program instruction is more complex, the amount of interleaving or alternating increases.

The second instruction example is another type of instruction included in group Iw(0)=1. It corresponds to an emulated program instruction coded for specifying a byte (8-bit) load register (LDH) operation. The LDH instruction is used copy a memory byte into a register. This instruction was selected for the purpose of illustrating the operation of the signal "catcher" mechanism contained in emulator exception handler 74 which maintains interpreter performance in the presence of segment violations.

As described earlier, the catcher mechanism processes each SIGNAL generated by the kernel process manager 70 in response to each occurrence of a segment violation. Because the optimized XA prefetches the operand in the case where IW(0)=1 of the emulated program instruction, the LDH instruction is one of the instructions which can result in the generation of a SIGNAL indicating a segment violation caused by accessing a word starting with the last half word of a segment for loading, adding, etc. As discussed above, a segment violation would normally cause the process running the interpreter to terminate which would result in incorrect emulation.

A preferred embodiment of the catcher mechanism of the present invention is illustrated in Appendix II. As indicated in the Appendix, the mechanism first tests the lower 12 of the effective address register for determining if the last byte of a segment (page) is being accessed. The mechanism next tests to determine if the offending RISC instruction is a fetch (lha) instruction. If both tests are positive, the mechanism sequences the interpreter unit 72 to a code fragment which refetches the byte operand. This code fragment performs as a recovery or fix function for enabling the interpreter unit to return to the next RISC instruction of the code fragment which was being executed when the segment violation occurred. This allows the violation to be treated as a false alarm enabling the interpreter unit 72 to continue to faithfully emulate the behavior of the LDH emulated program instruction.

FIG. 7 illustrates the pipelined execution of the LDH instruction which is quite similar to the LDR instruction of FIG. 6 in the absence of a segment violation. The code fragments designated on the left side of FIG. 7 are the same as those indicated in the timing state portion of the figure with different labels showing the transitions between the different code fragments/routines within the interpreter unit 72. As in the previous instruction example, such code fragments are discontiguous sections of code in the interpreter unit 72 as illustrated in Appendix II.

Since this emulated program instruction is performed in a manner similar to the first emulated program instruction example, it will not be discussed in detail. However, it will be noted that in the case of a segment violation, the catcher mechanism is invoked and following the processing of the violation by the mechanism in the manner described above, the interpreter unit continues execution of the RISC instructions as indicated (start of clock cycle 9). It will be appreciated that there is a break in execution after which pipelined operation begins. Because of this, the RISC instructions designated in FIG. 7 may not appear exactly as they would in the absence of the violation. This area of FIG. 7 is shown with a double-line border.

While the catcher mechanism was described in terms of a specific emulated program instruction type, the same mechanism may be used with other types of emulate program instructions for detecting false alarm occurrences and for enabling recovery from such occurrences thereby ensuring that faithful emulation is not lessened as a consequence of having been optimized according to the teachings of the present invention.

Also, it will be appreciated that the instruction being processed during the fetch phase in which a segment violation occurred may actually be one of three different types of instructions (i.e., shift, value or branch). In the case of a shift or a value instruction, the computation operations are completely inappropriate while in the case of a branch instruction, it is too early to determine if the branch will be taken. Therefore, the foreground instruction stream is allowed to continue to operate at optimum performance.

From the above description, it is seen by organizing an interpreter unit according to the teachings of the present invention, it is possible to optimize interpreter performance through the simultaneous execution of foreground and background instruction streams by a plurality of integer execution units of a host system. While the preferred embodiment disclosed the use of two integer execution units, the teachings of the present invention are applicable to any number of integer execution units. Also, the present invention may be used with other types of enhanced CPU architectures.

It will be appreciated that many changes may be made to the organization of the interpreter unit of the present invention. While the preferred embodiment indicated that several types of instructions share a single code fragment, this is not required by the teachings of the present invention. The programmer is free to program emulated program instructions in the manner deemed most appropriate.

These Appendices include source listings which are subject to copyright protection. The copyright owner, Bull HN Information Systems Inc., has no objection to the facsimile reproduction by any one of the patent disclosure, as it appears in the Patent and Trademark Office patent files or records, but otherwise reserves all copyright rights in such listings whatsoever.

APPENDIX I—Load Register Instruction

APPENDIX II—Load Byte Register Instruction and Catcher Mechanism

APPENDIX I

BLOCK F

```

                            #    Start of Instruction

                    (normal start, bypassed in optimized code)
soi:
            sli.      dt,iw,2            # iw * 4
            lx        w0,dt,top,         # fetch XA entry
soi_p2:
            mtlr      w0                 # prepare to splatter
            bge       0,soi_0            # branch for opcodes 0-0x7ff (executed
                                            by ICU)
            rlimm     w2,iw,28,21,28     # get index to XE table
soi_1:
P1          lux       wo,w2,xep          # fetch XE pointer (MAS) (f)
Q1          lha       dt,2(p)            # fetch @ (P + 2) (next instr. if
                                            current instr. is one word) (b)
P2          l         w1,4(w2)           # fetch XE pointer (RAS) (f)
Q2          lha       z,4(p)             # fetch @ (P + 4) (next inst. if
                                            current inst. is two words) (b)
                    (start of instruction, optimized code)
soi_lb:
P3          mtctr     w0                 # move memory AS XE address to CTR (f)
Q3          sli.      dt,dt,2            # [@(P + 2)]*4 (b)
P4          st        p,ph               # save copy of P for traps (f)
Q4          sli       z,z,2              # [@(P + 4)] * 4 (b)
            bbfr      12                 # jump to entry pt if no interrupt (f)
                    (go to XA fragment/BLOCK D)
```

BLOCK D

```
# Base register effective address calculation, operand fetch
P5          mr        ea,bl              # centralize b register (f)
Q5          lx        w0,top,dt          # fetch next IW XA (b)
P6          mr        z,dt               # centralize next IW (b)
            bbtl      15,_xvba_vp        # if v pool,
                                            go to addr convert routine (f)
Q6          lha       dt,0(ea)           # fetch word operand (f)
P7          cal       p,2(p)             # advance P to next IW (b)
            bctr                         # splatter to XE (f)
                    (continue in XE fragment/BLOCK E)
```

BLOCK E

```
# Load R register execution routine
P8          srai      iw,z,2             # set next IW (b)
Q8          mtlr      w0                 # prepare to splatter (b)
P9          mr        rl,dt              # move operand to register (f)
Q9          rlimm     w2,iw,28,21,28     # get index to XE table (f)
            bge       0,soi_0            # branch for opcodes 0-0x7fff (f)
P10         lha       dt,2(p)            # fetch IW + 2 (b)
Q10         lux       w0,w2,xep          # fetch XE pointer (MAS) (f)
P11         lha       z,4(p)             # fetch IW + 4 (b)
Q11         l         w1,4(w2)           # fetch XE pointer (RAS) (f)
            b         soi_lb             # return to fetch routine (f)
        (return to start of instruction/BLOCK F, label <soi_lb>
```

APPENDIX II

BLOCK F

```

                            # Start of Instruction

                    (normal start, bypassed in optimized code)
soi:
            sli.      dt,iw,2            # iw * 4
            lx        w0,dt,top          # fetch XA entry
```

-continued

```
soi_p2:
         mtlr     w0                    # prepare to splatter
         bge      0,soi_0               # branch for opcodes 0-0x7fff
         rlinm    w2,iw,28,21,28        # get index to XE table
                        (start of instruction, optimized code)
      soi_1:
P1       lux      w0,w2,xep             # fetch XE ptr (MAS) (f)
Q1       lha      dt,2(p)               # fetch @(P + 2) (b)
P2       l        w1,4(w2)              # fetch XE ptr (RAS) (f)
Q2       lha      z,4(p)                # fetch @(P + 4) (b)
      soi_1b:
P3       mtctr    w0                    # move memory AS XE addr to CTR (f)
Q3       sli      dt,dt,2               # [@(P + 2)] * 4 (b)
P4       st       p,ph                  # save copy of P for traps (f)
Q4       sli      z,z,2                 # [@(P + 4)] * 4 (b)
         bbfr     12                    # jump to entry point if no intr (f)
                        (go to XA fragment/BLOCK D)
                                BLOCK D
#        Base register + index register
#        effective address calculation, operand fetch
P5       cax      ea,b1,r2              # add index to base (f)
Q5       mr       z,dt                  # centralize next IW (b)
P6       lx       w0,top,z              # fetch next IW XA (b)
         bbtl     15,_xvba_vp           # if v pool, go to addr
                                          convert routine (f)
Q6       lha      dt,0(ea)              # fetch word operand (f)
         Segment Violation occurs here, continue in Signal Catcher C code
              Segment Violation Signal Catcher C Code (partial)
/* handle rare case of word prefetch at last byte of AIX segment */
/* case 1: I pool, multiple sources of segvio */
/* test lower 12 bits of register ea for all 1 (last byte of page) */
         if((scp->sc_jmpbuf.jmp_context.gpr[25] & 0x0fff) = 0xfff)
         {
/* test instruction is : 'lha dt,0(ea)'*/
         longbase = (long *) scp->sc_jmpbuf.jmp_context.iar;
         if (*longbase = 0xab190000)
         {
/* set link register to follovang instruction */
         scp->sc_jmpbuf.jmp_context.lr =
                      scp->sc_jmpbuf.jmp_context.iar+4;
/* direct interpreter to fixup code */
         scp->sc_jmpbuf.jmp_context.iar=(long)fetch8;
         return;
         }
         }
/* case 2: V pool, single instance */
if(scp->sc_jmpbuf.jmp_context.iar = (long) xva16_segvio)
{
scp->sc_jmpbuf.jmp_context.lr=scp->sc_jmpbuf.jmp_context.iar+4;
scp->sc_jmpbuf.jmp_context.iar=(long)fetch8v;
return;
}
          Assembly code in interpreter unit to refetch byte operand
#        This code handles extraneous segvio's caused by the
#        sequence of a byte operand prefetch performed
#        via a 16 bit read on the very last byte of an AIX
#        segment. It is continuation code that the interpreter
#        is directed to by the segvio signal catcher when the
#        sequence is detected.

         .globl   fetch8v
         .globl   fetch8
fetch8v:
         cax      ea,ea,dt              # add M:seg_base to addr
fetch8:
         lbz      dt,0(ea)              # fetch byte operand
         sli      dt,dt,8               # move to right middle byte
         exts     dt,dt                 # sign extend
         br                             # return to original sequence
                            BLOCK D -(cont'd)
              Return here after Signal Catcher/fetch 8 code recovery,
                        or continue from BLOCK D
(Q7)     cal      p,2(p)                # advance P to next IW (b)
         bctr                           # splatter to XE (f)
                     (continue in XE fragment/BLOCK E)
                                BLOCK E
                  # Load R register halfword execution routine
(P8)     srai     iw,z,2                # set next IW (b)
(Q8)     mtlr     w0                    # prepare to splatter (b)
(P9)     srai     r1,dt,8               # store left byte (f)
```

-continued

| | | | |
|---|---|---|---|
| (Q9) | rlinm | w2,iw,28,21,28 | # get index to XE table (f) |
| | bge | 0,soi_0 | # branch for opcodes 0–0x7ff (f) |
| (P10) | lha | dt,2(p) | # fetch IW + 2 (b) |
| (Q10) | lux | w0,w2,xep | # fetch XE ptr (MAS) (f) |
| (P11) | lha | z,4(p) | # fetch IW + 4 (b) |
| (Q11) | l | x1,4(w2) | # fetch XE ptr (RAS) (f) |
| | b | soi_lb | # return to fetch routine (f) |
| | | (return to start of instruction/BLOCK F, label <soi_lb>) | |

It will be apparent to those skilled in the art that many changes may be made to the preferred embodiment of the present invention. For example, while the present invention is described in terms of an emulator application, the teachings of the present invention can be applied to other applications which could take advantage of using two separate independent instruction streams, a first stream for performing anticipation type operations and a second stream for performing operations utilizing the results of the first stream to complete an execution operation. Also, while the preferred embodiment discloses the use of a specific pipelined execution unit architecture, the teachings of the present invention may be used with other architectures and other types of processors which provide for parallel instruction execution. Also, while the preferred embodiment disclosed the use of two execution units for carrying out the processing of two instruction streams, more such units may be employed.

It will also be appreciated by those skilled in the art relative to other more specific aspects, that while the optimized emulated program instructions were described as being within two classes, other types of emulated program instructions could be similarly optimized. For example, floating point or scientific emulated program instructions could be optimized such that all of the integer units of the preferred embodiment would be used to fetch and otherwise prepare for the next emulated program instruction while the floating point execution units included in CPU 58a was busy executing the emulated scientific program instruction.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method of optimizing the performance of an interpretative emulator on a high performance computer system which includes an operating system and processing apparatus operating under control of the operating system, the processing apparatus having n number of execution units operatively coupled to a control mechanism which examines sequential instructions in parallel for dispatching the instructions to the execution units for simultaneous execution, the emulator including an interpreter unit operating under the control of the operating system to execute emulated program instructions of a target system using the execution units, the method comprising:

(a) generating a first set of RISC instructions of a common RISC fetch routine for carrying out an instruction fetch operation which is to be executed by the interpreter unit corresponding to a first type of operation;

(b) generating a second set of RISC instructions of a RISC routine for each different emulated program instruction which is to be executed by the interpreter unit corresponding to a second type of operation; and, (c) interleaving replications of the RISC instructions of the first set of RISC instructions of the common RISC fetch routine generated in step (a) with the RISC instructions of the second set of RISC instructions of each of the RISC routines generated in step (b) for causing the control mechanism to dispatch sets of interleaved RISC instructions to a plurality of the n number of execution units for simultaneous execution enabling both first and second types of instruction operations to be performed in parallel.

2. The method of claim 1 wherein the first and second type of instruction operations correspond to foreground and background operations respectively and wherein step (c) further includes the step of first replicating the RISC instructions of the common RISC fetch routine at least once for each of the RISC routines generated in step (b).

3. The method of claim 1 wherein the emulated program instructions fall into first and second classes and wherein step (c) further includes the step of first replicating the RISC instructions of the common RISC fetch routine at least once in each of the RISC routines generated for emulated program instructions contained in the first class and the second class respectively.

4. The method of claim 1 wherein, the method further includes the steps of:

(d) detecting an occurrence of a predetermined type of exception condition produced by interpreter unit emulated program instruction execution; and, (e) determining if the violation condition detected in step (d) can be processed without having to terminate interpreter unit instruction execution.

5. The method of claim 4 wherein the emulator further includes an exception handler mechanism operatively coupled to the interpreter unit and to the operating system for receiving signals indicating occurrences of exception conditions and for terminating interpreter unit operation upon receipt of exception condition signals indicating the occurrence of segment violations, said method further including the steps of:

(f) including in the exception handler mechanism, a catcher code mechanism invoked by signals indicative of the segment violations;

(g) determining by the catcher code mechanism if the offending code fragment being executed by interpreter unit precipitating the exception condition pertained to an optimized emulated program instruction execution and can be deemed a false alarm signal;

(h) executing a predetermined routine for recovering from the segment violation caused by the optimized emulated program instruction; and, (i) returning the interpreter unit execution to the offending code fragment to continue execution following completion of step (h).

6. The method of claim 5 wherein step (g) further includes the steps of:

(j) testing the contents of an address register for determining the type of memory access;

(k) testing the offending RISC instruction for determining the type of operation being performed; and, (l) when the results of both steps (j) and (k) indicate that a predetermined type of optimized emulated program instruction was being executed, signaling that the exception has been processed as a false alarm.

7. The method of claim 5 wherein step (h) includes the step of executing another routine in the interpreter for refetching an operand in a predetermined manner enabling a complete recovery from the segment violation only when caused by the optimized emulated program instruction.

8. The method of claim 1 wherein n equals two and one of the pipelined integer units executes a foreground RISC instruction stream and another of the pipelined integer units executes a background RISC instruction stream.

9. The method of claim 8 wherein the foreground instruction stream interprets the current emulated program instruction and the background instruction stream prefetches the next emulated program instruction.

10. The method of claim 1 wherein the interpreter unit is organized into a number of code fragments, a first code fragment of the number including RISC instructions of the common RISC routine and other code fragments containing RISC instructions for executing different classes of emulated program instructions through a dispatch loop, the dispatch loop for each unoptimized emulated program instruction consisting of executing RISC instructions contained in the first code fragment and one of the other code fragments, the method further including the steps of:

(1) determining which different types of emulated program instructions in the emulated program instruction set are required to be optimized for providing a desired level of performance; and, (2) including a predetermined portion of the RISC instructions of the common RISC routine into each of the other code fragments used to execute optimized emulated program instructions of a set of instructions being emulated in a manner which reduces the number of RISC clock cycles or the duration of the dispatch loop through the simultaneous use of the plurality of execution units.

11. The method of claim 10 wherein the RISC instructions executed in parallel do both the execution portion of the current emulated program instruction and the fetch and decode operations for the next emulated program instruction.

12. The method of claim 10 wherein the other code fragments used in executing optimized emulated program instructions include a code which performs both effective address development (xa) and operation code execution (xe) operations.

13. The method of claim 10 wherein one type of optimized emulated program instruction is a load register type instruction.

14. The method of claim 10 wherein another type of optimized emulated program instruction is a byte load type instruction.

15. The method of claim 10 wherein the set of emulated program instructions includes first and second groups of emulated program instructions, each emulated program instruction of the first group being performed by the interpreter unit executing RISC instructions of the first code fragment for carrying out an emulated instruction fetch operation and RISC instructions of another code fragment for executing the operation specified by the operation code of the emulated program instruction and each emulated program instruction of the second group being performed by the interpreter unit executing RISC instructions of the first code fragment for carrying out an emulated instruction fetch operation and other code fragments for performing an effective address development operation followed by the operation specified by the operation code of the emulated program instruction.

16. The method of claim 15 wherein each optimized instruction in the first group of emulated program instructions incorporates the RISC instructions of the first code fragment interleaved with the RISC instructions of the another code fragment for performing both foreground and background emulated program instruction operations in parallel.

17. The method of claim 15 wherein each optimized instruction in the second group of emulated program instructions incorporates RISC instructions of the first code fragment in both of the other code fragments for performing both foreground and background emulated instruction operations in parallel.

18. The method of claim 15 wherein the other code fragments executed by the interpreter unit for each emulated program instruction in the second group are included as part of one code fragment.

19. An optimized interpretative emulator system comprising a high performance computer system having an operating system and processing apparatus operating under control of the operating system, the processing apparatus having a plurality of execution units operatively coupled to a control mechanism which examines sequential instructions in parallel and dispatches a plurality of instructions to the execution units for simultaneous execution, the emulator system including an interpreter unit operating under the control of the operating system to execute a set of emulated program instructions using the execution units, the interpreter unit comprising:

a common RISC fetch routine including a first set of RISC instructions for causing the processing apparatus to carry out an instruction fetch operation as a background operation for each emulated program instruction; and, a plurality of RISC routines, each RISC routine including a second set of RISC instructions for causing the processing apparatus to execute a different emulated program instruction as a foreground operation and each RISC routine further including RISC instructions of the first set interleaved with the RISC instructions of the second set, the control mechanism being operative during execution of each different emulated program instruction to dispatch sets of interleaved RISC instructions to a plurality of execution units for simultaneous execution for performing both foreground and background emulated instruction operations in parallel.

20. The emulator system of claim 19 wherein the emulator system further includes an exception handler mechanism operatively coupled to the interpreter unit and to the operating system for receiving signals indicating occurrences of exception conditions and for terminating interpreter unit operation upon receipt of exception condition signals indicating the occurrence of segment violations, said exception handler mechanism further including a catcher mechanism invoked by signals indicative of the segment violations, the catcher code mechanism including:

first means for determining if the offending RISC routine being executed by interpreter unit precipitating the exception condition pertained to the execution of a predetermined type of optimized emulated program instruction and can be deemed a false alarm signal; and second means for performing a recovery operation when necessary and for returning the interpreter unit execution to the offending code fragment to continue execution at a point following the offending RISC instruction which caused the first means to detect the false alarm is signal.

21. A method of optimizing the performance of an application on a high performance computer system which includes an operating system and processing apparatus operating under control of the operating system, the processing apparatus having n number of execution units operatively coupled to a control mechanism which examines sequential instructions in parallel for dispatching the instructions to the execution units for simultaneous execution, the application including a unit operating under the control of the operating system to execute program instructions using a plurality of execution units, the method comprising:

(a) generating a first set of instructions of a common fetch routine for carrying out an instruction operation corresponding to an anticipatory type of operation;

(b) generating a second set of instructions of a routine for each different program instruction which is to be executed by the application corresponding to a current type of operation; and, (c) interleaving replications of the instructions of the first set of instructions of the common fetch routine generated in step (a) with the instructions of the second set of instructions of each of the routines generated in step (b) for causing the control mechanism to dispatch sets of interleaved RISC instructions to the plurality of execution units for simultaneous execution enabling both anticipatory and current types of instruction operations to be performed in parallel.

* * * * *